Patented Nov. 10, 1953

2,658,918

UNITED STATES PATENT OFFICE 2,658,918

CHLORODIKETONE

Earl T. McBee and Jack S. Newcomer, West Lafayette, Ind., assignors to Purdue Research Foundation, West Lafayette, Ind., a corporation of Indiana No Drawing. Application October 1, 1948, Serial No. 52,410

4 Claims. (Cl. 260—586)

1

The present invention is concerned with a novel ketone and a process whereby said ketone may be produced. This application is a continuation-in-part of our U. S. Patent No. 2,597,016.

The compound of the present invention is a pentachlorodiketone having a cyclopentene nucleus, an empirical formula of $C_7Cl_5O_2H$, and the probable formula:

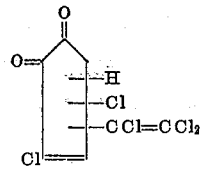

This new compound melts at about 96 degrees centigrade, and is useful as a fungicide and as an intermediate in the preparation of more complex organic compounds.

The above-identified compound may be prepared by hydrolyzing trichlorovinylpentachlorocyclopentadiene with concentrated sulfuric acid, preferably about 70 percent concentration. The reactants are admixed in any suitable manner, and the temperature then regulated to maintain the desired level. The temperature range for the reaction is usually between about 70 and 150 degrees centigrade, preferably between about 100 and 125 degrees centigrade. Agitation of the reaction mixture is preferably employed to insure efficient contact of the reactants. The exact time required for the reaction is dependent upon a number of factors, e. g., temperature, method of agitation, acid concentration, et cetera. However, the reaction is preferably discontinued at or about that time when the acid layer and the organic layer become one, ordinarily not in excess of about ten hours. If the reaction is allowed to proceed further, the yield of desired product is generally decreased. A yellow crystalline diketone, having the empirical formula $C_7Cl_5O_2H$ and a melting point of about 96 degrees centigrade, may be separated from the reaction product by pouring the reaction product on ice or by extracting it with an organic solvent, e. g., carbon tetrachloride or chloroform, and evaporating the solvent. The diketone may then be purified, as by recrystallization or other conventional procedure, if desired.

The diketone may also be prepared, as illustrated in Example 1 hereinafter, and described in our copending application U. S. Patent No. 2,597,016 and which is claimed in the continuation-in-part thereof, Serial No. 52,407, filed concurrently herewith, now abandoned, from dialkyl ketals of trichlorovinyltrichlorocyclopentadienone by hydrolysis with concentrated sulfuric or other strong acids at temperatures above about 30 degrees centigrade, using substantially the same procedure as described for hydrolysis of the trichlorovinylpentachlorocyclopentadiene except that considerably milder conditions are usually satisfactory.

The trichlorovinylpentachlorocyclopentadiene referred to herein may be prepared as disclosed in our prior copending application U. S. Patent No. 2,597,016, and preferably involves the condensation of hexachlorocyclopentadiene with trichloroethylene in the presence of aluminum chloride at a temperature of approximately 110 degrees centigrade. Methods for the preparation of ketals of trichlorovinylpentachlorocyclopentadiene are also disclosed in U. S. Patent No. 2,597,016.

The following examples are given to illustrate the practice of the present invention but are not to be construed as limiting.

*Example 1.—Conversion of trichlorovinyl-5,5-dimethoxytrichlorocyclopentadiene to the pentachlorodiketone $C_7Cl_5O_2H$*

During a period of five minutes, 50 grams of trichlorovinyl - 5,5 - dimethoxytrichlorocyclopentadiene was added to 300 grams of concentrated sulfuric acid at 30 to 35 degrees centigrade. The blood-red liquid, obtained by pouring the reaction mixture onto ice, was washed with water and recrystallized three times from petroleum ether (boiling range 35 to 37 degrees centigrade) to obtain 5 grams of a yellow diketone compound, $C_7Cl_5O_2H$, which was found to contain 60.1 percent chlorine (calculated 60.2 percent chlorine) and to melt at about 96 degrees centigrade. The product was shown to be identical with the compound $C_7Cl_5O_2H$ obtained by the action of sulfuric acid on trichlorovinylpentachlorocyclopentadiene, in accordance with Example 2 hereinafter, by the method of mixed melting points.

*Example 2.—Hydrolysis of trichlorovinylpentachlorocyclopentadiene to the pentachlorodiketone $C_7Cl_5O_2H$*

A mixture of 1000 grams of trichlorovinylpentachlorocyclopentadiene and 4000 grams of concentrated sulfuric acid was stirred vigorously for seven hours at 120 to 125 degrees centigrade. The reaction mixture gradually became dark with the simultaneous conversion of the two-phase system to a one-phase system. The cooled reaction mixture was extracted five times with a total of five liters of carbon tetrachloride. Evaporation of the solvent and recrystallization of the resulting solid from carbon tetrachloride produced 315 grams of the yellow diketone compound $C_7Cl_5O_2H$, having a melting point of about 96 degrees centigrade, identical with the compound $C_7Cl_5O_2H$ obtained by the hydrolysis of trichlorovinyl - 5,5 - dimethoxytrichlorocyclopentadiene with concentrated sulfuric acid in accordance with Example 1 hereinbefore, as shown by the method of mixed melting points.

Various modifications may be made in the method of the present invention without departing from the spirit or scope thereof, and it is to be understood that we limit ourselves only as defined in the appended claims.

We claim:

1. A pentachlorodiketone having the empirical formula $C_7Cl_5O_2H$, which is a yellow crystalline solid possessing, in the pure state, a melting point of approximately 96 degrees centigrade, that is identical with the product obtained by heating concentrated sulfuric acid at a temperature between approximately 70 and approximately 150 degrees centigrade with trichlorovinyl pentachlorocyclopentadiene, prepared by the condensation of hexachlorocyclopentadiene with trichloroethylene in the presence of aluminum chloride at approximately 110 degrees centigrade.

2. A process for the production of the pentachlorodiketone defined in claim 1, which comprises heating trichlorovinylpentachlorocyclopentadiene, prepared by the condensation of hexachlorocyclopentadiene with trichloroethylene in the presence of aluminum chloride at a temperature of approximately 110 degrees centigrade, with sulfuric acid, and subsequently recovering the pentachlorodiketone.

3. A process for the production of the pentachlorodiketone defined in claim 1, which comprises heating trichlorovinylpentachlorocyclopentadiene, prepared by the condensation of hexachlorocyclopentadiene with trichloroethylene in the presence of aluminum chloride at a temperature of approximately 110 degrees centigrade, with a substantial proportion of concentrated sulfuric acid at a temperature between approximately 70 and approximately 150 degrees centigrade, and subsequently recovering the pentachlorodiketone.

4. A process for the production of the pentachlorodiketone defined in claim 1 which comprises heating trichlorovinylpentachlorocyclopentadiene, prepared by the condensation of hexachlorocyclopentadiene with trichloroethylene in the presence of aluminum chloride at a temperature of approximately 110 degrees centigrade, with a substantial proportion of concentrated sulfuric acid at a temperature between approximately 100 and approximately 150 degrees centigrade, and subsequently recovering the pentachlorodiketone.

EARL T. McBEE.
JACK S. NEWCOMER.

REFERENCES CITED

Prins, Rec. trav. Chim., vol. 65, pages 455–467.